May 27, 1958  L. F. WOODEL  2,836,333
FERRULE FOR EXTRUSION NOZZLES
Filed Nov. 18, 1955

INVENTOR
Leonard F. Woodel
BY
Mason, Fenwick & Lawrence
ATTORNEYS

United States Patent Office 2,836,333
Patented May 27, 1958

2,836,333

FERRULE FOR EXTRUSION NOZZLES

Leonard F. Woodel, Hollis, N. Y.

Application November 18, 1955, Serial No. 547,798

1 Claim. (Cl. 222—575)

This invention relates to adapters for use with deformable extrusion nozzles, particularly with such nozzles on containers of plastic materials where the nozzle is utilized to control and direct the flow of plastic material.

Materials such as caulking compound are usually packaged in paper-board cartridges for insertion in a gun. Operation of the gun forces the compound out of the cartridge through a nozzle, which confines the flow and permits the operator to direct it into an opening to be caulked. As the openings are of different widths and shapes, it is frequently difficult to confine the compound in the desired space.

The object of the present invention is to provide an adapter, or ferrule, which may be placed on the end of a deformable extrusion nozzle to change the cross-sectional shape of the outlet end of the nozzle.

Another object is to provide an adapter of this nature which is capable of application in different ways to a single nozzle to provide several cross-sectional shapes for the nozzle.

A further object is the provision of an adapter which can be manufactured very cheaply, in fact, so cheaply that one can be provided with each cartridge and disposed of when the cartridge is empty.

Other objects of the invention will become apparent from the following description of one practical embodiment thereof, when taken in conjunction with the drawings which accompany, and form part of, this specification.

Figure 1:
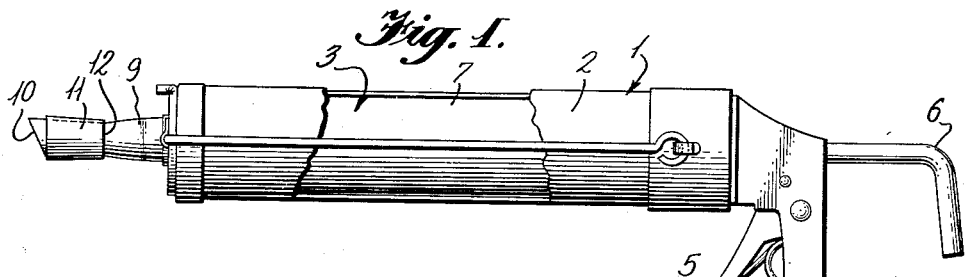
Figure 1 is a side elevation of a caulking gun with a cartridge in place and an adapter constructed in accordance with the present invention in place on the nozzle.
Figure 2:
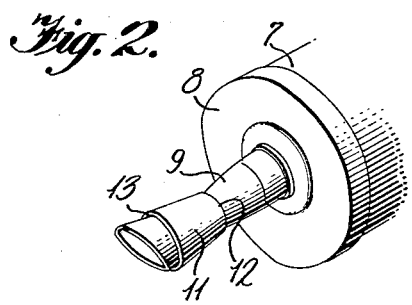
Figure 2 is a perspective view of the nozzle and a portion of the cartridge with the adapter in one position on the nozzle.
Figure 3:
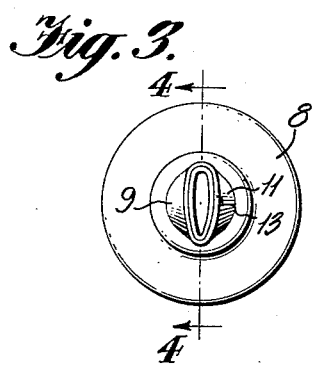
Figure 3 is an end view of the structure shown in Figure 2.
Figure 4:
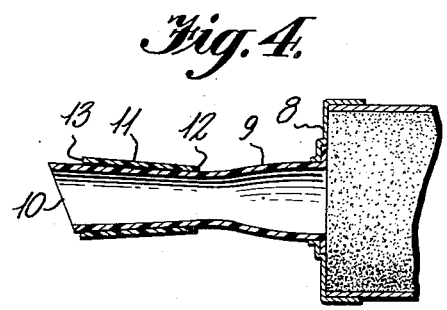
Figure 4 is a longitudinal section through the nozzle, adapter and the end of the cartridge; and, Figure 5 is a perspective view showing the adapter in another position on the extrusion nozzle.

In general, the invention consists of an adapter to slip over a deformable extrusion nozzle, the adapter having a different cross-sectional shape from that of the nozzle so that the nozzle shape can be changed.

Referring to the drawings in detail, there is shown a conventional caulking gun 1, having a cylinder 2 to receive a cartridge 3 of caulking compound. The gun has the usual grip 4 and trigger 5. Operation of the trigger controls the movement of a spring-actuated plunger (not shown) which forces the material out of the forward end of the cartridge. The plunger is cocked in the usual fashion by means of the lever 6.

The cartridge has a cylindrical body 7 and an end cap 8, fitted with a projecting nozzle 9. The nozzle usually employed is of a somewhat flexible plastic and can be deformed. The nozzle is of round cross-section, and tapers from the cap to the outer end. The extreme end is usually cut off at an angle, as at 10, to form a quill-like affair which can be used to apply the compound where needed.

The adapter, or ferrule, 11 is designed to slip over the end of the nozzle to deform the discharge end from its round shape. It consists of a hollow, open ended member of metal, rigid plastic, or the like, having a leading end 12 which is round in cross-section and of a larger inside diameter than the outside diameter of the end of the nozzle. The relative diameters of the adapter and nozzle are such that the leading end of the adapter will find its seat upon the nozzle and be in snug frictional contact therewith when the trailing end 13 of the adapter is on the nozzle and spaced slightly from the end thereof, as shown in the drawings. If the adapter is made of metal, it will be made from tubular stock of uniform diameter and the trailing end will be flattened to subtsantially oval shape. If it is plastic, it may be molded to this shape, or a plastic tube may be used, cut off to the desired length, softened and flattened as with the metal tube. In any event, the leading end of the adapter is circular to conform to the nozzle shape and the trailing end is flattened.

Figure 5:
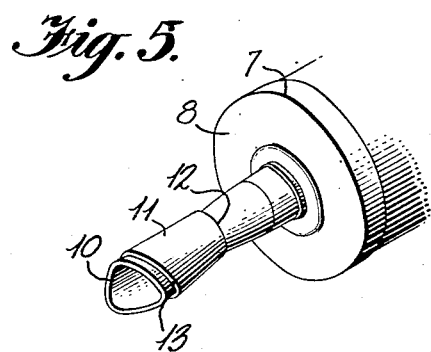
Figure 6:
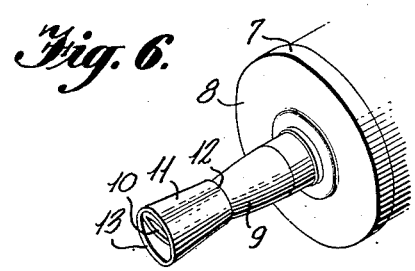

When the adapter is used, it is slipped over the end of the nozzle until the leading end seats firmly about the nozzle. The flattened trailing end will compress the outlet end of the nozzle out of its round shape to conform to the shape of the adapter. If the compound is to be applied in a broad band, the adapter is applied so that the long axis of the flattened end will be horizontally of the gun, as shown in Figure 5. This flattens the nozzle outlet depthwise and consequently increases the widthwise dimension. Thus, a broad applicator is provided. If a narrow band is desired, the adapter is oriented 90° from the position just described, so that its long axis is vertical with respect to the gun. This narrows the width of the orifice and increases its height. The adapter, therefore, provides means for changing the nozzle outlet orifice to two shapes other than the one in which it is made to permit varying the extruded compound cross-section to suit different conditions. This will materially aid in the caulking operation by controlling the compound delivery.

While, in the above, one practical embodiment of the invention has been disclosed, it will be understood that the details of construction described and shown are merely by way of example and the invention may take other forms within the scope of the appended claim.

What is claimed is:

A ferrule for tapered extrusion nozzles of deformable material which are round in cross-section comprising, a tubular member of rigid material having a leading end of round cross-section of such inside diameter as to have a snug fit around said nozzle when the ferrule is completely on the nozzle, and a trailing end of oval cross-section with the inside length of the short axis being less than the diameter of the nozzle at the trailing end when the ferrule is in place on the nozzle.

References Cited in the file of this patent

UNITED STATES PATENTS

| | | |
|---|---|---|
| 577,362 | Ettlinger | Feb. 16, 1897 |
| 1,865,012 | Jackson | June 28, 1932 |
| 2,300,679 | Klein | Nov. 3, 1942 |
| 2,593,420 | Diel | Apr. 22, 1952 |